United States Patent
Walby

(10) Patent No.: US 9,656,158 B1
(45) Date of Patent: May 23, 2017

(54) AUTOMOTIVE HEAD UNIT THAT VERBALLY ADMINISTERS QUIZZES

(71) Applicant: Continental Automotive Systems, Inc., Auburn Hills, MI (US)

(72) Inventor: James A. Walby, Delavan, WI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 52 days.

(21) Appl. No.: 14/975,106

(22) Filed: Dec. 18, 2015

(51) Int. Cl.
| | | |
|---|---|---|
| *A63F 9/24* | (2006.01) | |
| *A63F 9/18* | (2006.01) | |
| *A63F 13/35* | (2014.01) | |
| *B60W 50/08* | (2012.01) | |

(52) U.S. Cl.
CPC .............. *A63F 9/183* (2013.01); *A63F 13/35* (2014.09); *A63F 2300/8017* (2013.01); *B60W 50/08* (2013.01)

(58) Field of Classification Search
None
See application file for complete search history.

(56) References Cited

U.S. PATENT DOCUMENTS

| | | | | |
|---|---|---|---|---|
| 2014/0309849 A1* | 10/2014 | Ricci | ........................ | B60Q 1/00 701/33.4 |
| 2014/0309864 A1* | 10/2014 | Ricci | ..................... | H04W 48/04 701/36 |
| 2014/0337546 A1* | 11/2014 | Kitahama | ................. | G06F 3/02 710/73 |

\* cited by examiner

*Primary Examiner* — Jason Yen

(57) ABSTRACT

An automotive head unit wirelessly retrieves quiz questions and quiz answers from a quiz server; receives data from vehicle sensors regarding whether the vehicle is in a low-risk-driving situation. When the vehicle is in a low-risk-driving situation, the head unit: verbally administers a quiz by playing one or more quiz questions through a speaker associated with the head unit; receives, via a microphone associated with the head unit, one or more quiz answers spoken by one or more vehicle occupants; and checks the quiz answers for accuracy.

15 Claims, 3 Drawing Sheets

AUTOMOTIVE HEAD UNIT THAT VERBALLY ADMINISTERS QUIZZES

BACKGROUND

Embodiments of the invention relate to an automotive head unit configured to verbally administer quizzes to vehicle occupants during relatively low-risk-driving situations.

Certain driving situations are relatively low risk. For example, driving on a highway with cruise control, low traffic volume, and the like. Low risk driving situations of this type sometimes lead to drivers falling asleep. And sometimes in such situations, intellectually stimulating entertainment would be desirable as it may lead to, among other things, improved mental health and improved driver alertness. As such, an automotive head unit that administers quizzes, by issuing verbal questions and receiving verbal responses, to drivers and/or other vehicle occupants, would advance the art.

BRIEF SUMMARY

In accordance with embodiments of the invention, an automotive head unit wirelessly retrieves quiz questions and quiz answers from a quiz server; receives data from vehicle sensors regarding whether the vehicle is in a low-risk-driving situation. When the vehicle is in a low-risk-driving situation, the head unit: verbally administers a quiz by playing one or more quiz questions through a speaker associated with the head unit; receives, via a microphone associated with the head unit, one or more quiz answers spoken by one or more vehicle occupants; and checks the quiz answers for accuracy.

DETAILED DESCRIPTION

Figure 1:
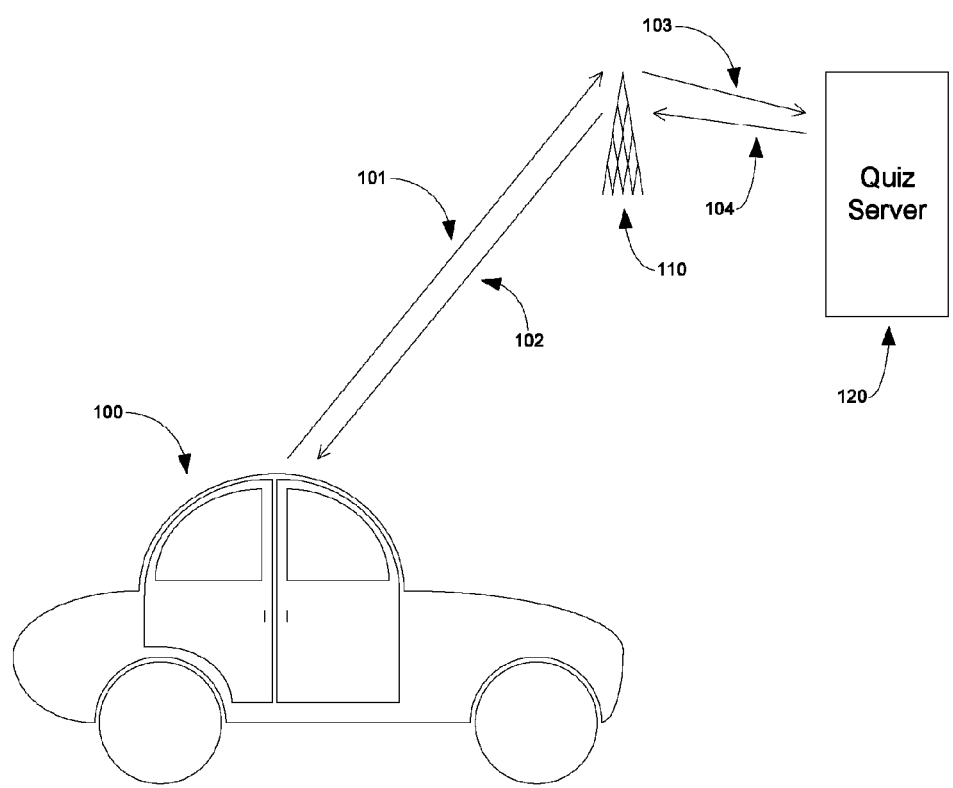
FIG. 1 depicts an operating environment for embodiments of the invention.

In accordance with embodiments of the invention, an automotive head unit may administer a trivia quiz and/or a specialized topics quiz. Such quizzes may be administered by the head unit reciting audible questions and the driver of the vehicle and/or one or more additional quiz takers in the vehicle, responding verbally with quiz answers. Many topics are available for such quizzes, such as, for example, points of interest or history of a geographic location where the vehicle is travelling, local sports teams, a local dialect, and many other possible topics.

A head unit may connect to a quiz server to obtain quiz questions and quiz answers via a wireless connection (e.g., cellular packet data, WiFi, Car2X, etc.). The quiz server may also be used for posting scores to compete with other quiz takers. Vehicle manufacturers may then offer prizes, if desired, to promote use for improved mental health. Prizes may be based on various achievements, such as amount of participation, reaching a minimum score, reaching a cumulative score, high score in a given time period, improvement over time, etc. Prizes may be simple things, such as coupons for service that might also bring in more dealership service business (e.g., $2 off of next oil change), automotive bling (keychains, stickers, posters, decals, etc.), or even rebates for new vehicle purchases. In other embodiments, a quiz may be stored other than on a quiz server. For example, a quiz may be stored locally in vehicle memory or on a quiz taker's smartphone.

The head unit may be in communication with vehicle sensors to determine appropriate times to allow a driver to participate in quizzes. Such an arrangement may prevent driver involvement when in congested traffic, on urban or suburban streets, etc., and may allow driver involvement in "low risk" conditions, including, but not limited to, driving on a highway while using cruise control and/or in low traffic volume, and the like.

The head unit may be linked, via Bluetooth or similar wireless technology, to data-enabled wearable devices worn by vehicle occupants. Such an arrangement allows multiple quiz takers, other than the driver, to participate in a quiz and would allow the first person to raise their hand (as detected by the wearable devices) to answer a quiz question.

In order to reduce voice recognition requirements, the quiz may be presented as multiple choice questions so that only a few letters get recognized (e.g., "A", "B", "C", and "D").

In this way, embodiments of the invention may be used to keep a driver focused/awake on long, relatively boring drives and also may be used to help students when studying for exams. Further, such use of embodiments of the invention may lead to: improved driver mental health via increased trivia knowledge/brain use; a potential revenue stream for vehicle manufacturers via prizes related to vehicle service, manufacturer branding, and/or new vehicle purchase; and improved student grades due to improved test preparation.

Figure 2:
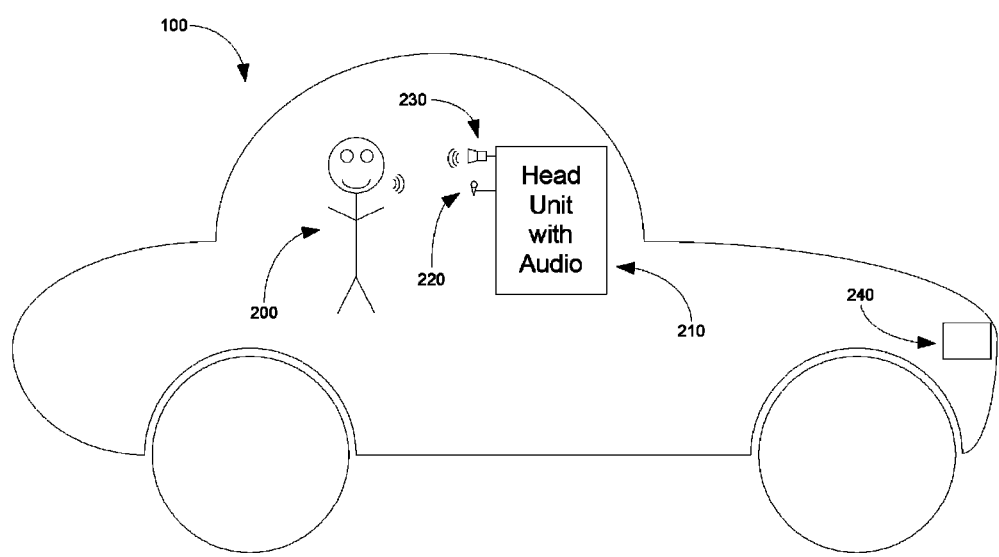
FIG. 2 depicts an apparatus in accordance with embodiments of the invention.

FIGS. 1 and 2 depict an operating environment for, and an apparatus in accordance with, various embodiments of the invention. A vehicle 100 connects to quiz server 120 via a wireless network 110, such as, for example, a cellular network, with a packet data connection to the server (e.g., TCP/IP) to retrieve quiz questions and quiz answers.

Vehicle 100 may include a head unit 210 having audio input and audio output capabilities. The head unit 210 may send a request to the quiz server 120 for quiz questions and/or quiz answers via wireless communication links 101 and 103 of the wireless network. The quiz server may provide the requested information to the head unit via wireless links 104 and 102 of the wireless network. The quiz information received from the quiz server 120 may be stored locally by the head unit 210.

As is well known in the art, a head unit is a central component of a vehicle's sound system and is typically located in the center of a vehicle's dashboard. Head units typically give users control over the vehicle's entertainment media: AM/FM radio, satellite radio, CDs, MP3, GPS navigation, Bluetooth, etc. Many audio-only head units afford the user precise control over detailed audio functions such as volume, band, frequency, speaker balance, speaker fade, bass, treble, EQ, and so on.

A vehicle occupant 200 may request to take a quiz verbally via a microphone 220 of the head unit. The head unit may then check the vehicle's outside environment via vehicle sensors 240 to determine whether those conditions allow for a quiz (e.g., "low risk" environment) to be given. Such vehicle sensors may include, but are not limited to: one or more cameras, radar, lidar, pedestrian detection, night vision, blind spot detection, drowsiness detection, adaptive cruise control, lane departure warning, and the like. As is well known in the art, the various sensors may communicate with the head unit via a vehicle bus, such as, for example, a Controller Area Network (CAN) bus.

The head unit 210 may administer quiz questions to one or more vehicle occupants via one or more speakers 230 associated with the head unit and may obtain spoken quiz answers via the microphone 220 associated with the head unit.

The head unit 210 may maintain one or more quiz scores based on correct answers, question difficulty, response times, and the like. When a quiz is complete, such as, for example, when a certain number of questions have been answered, a certain score has been reached, a driver/occupant requests to end a quiz, the vehicle moves into a region requiring more driver focus, or the like), the head unit 210 may send the quiz results to the quiz server 120 via the wireless network 110. The quiz server 120 may use the received quiz results to optionally update high score lists, determine prize awards, and the like.

Figure 3:
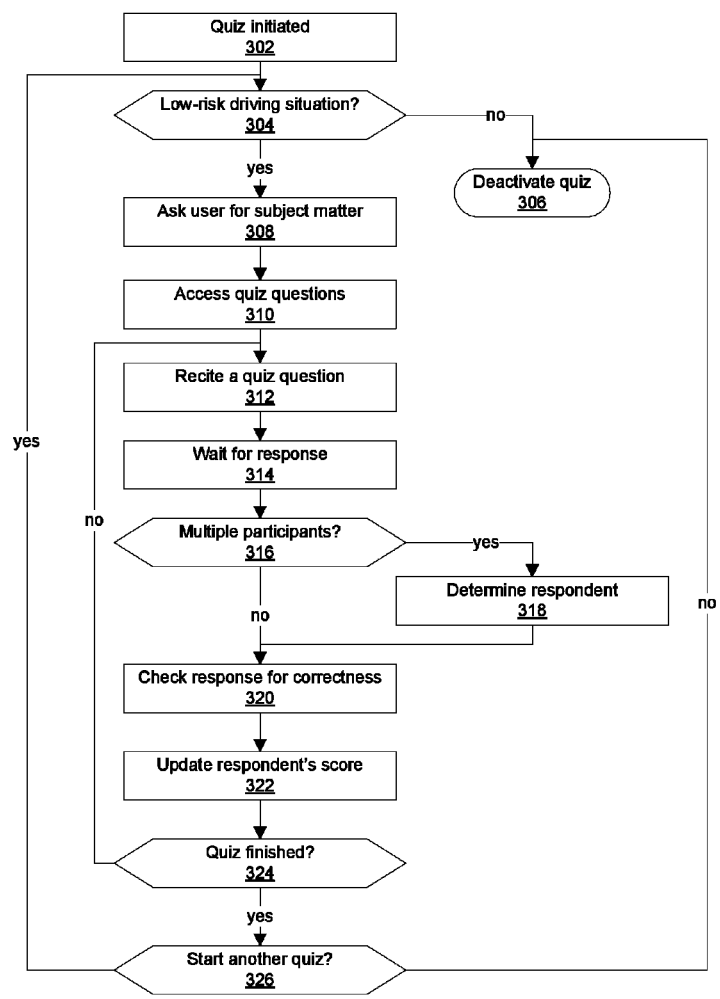
FIG. 3 is a flowchart that shows steps of a method in accordance with embodiments of the invention.

FIG. 3 shows steps of a method in accordance with embodiments of the invention. The method begins at 302 with a quiz being initiated. As indicated above, a user may verbally request a quiz through the head unit's microphone. Such a verbal request may specify the number of quiz participants. The head unit may also automatically initiate a quiz under certain conditions, such as, for example, when the vehicle sensors detect that a driver is becoming drowsy, driving conditions are relatively boring, and the like. Conditions such as these for automatically initiating a quiz may be user-selectable and may be pre-configured by the driver of a vehicle.

At 304, a determination is made with respect to whether the vehicle is in a low-risk driving situation. If the vehicle is not in a low-risk driving situation, the no branch is followed to 306 where the quiz is deactivated. If the vehicle is in a low-risk driving situation, the yes branch from 304 is followed to 308 where one or more quiz takers are asked about what type of quiz subject matter is desired.

At 310, quiz questions are accessed, which, as indicated above, may involve accessing a quiz server via a wireless network. Alternatively, quiz questions may be locally saved in memory of the head unit or may be stored on a smart phone that has a data connection with the head unit.

At 312, a quiz question is recited, and, at 314, a response is awaited. A determination is then made at 316 with respect to whether there are multiple quiz participants. If there are multiple quiz participants, the yes branch from 316 is followed to 318 where an identity of the person answering the quiz question is determined. Identification of the person answering the question may be performed by speech recognition. In some embodiments, quiz participants may wear wearable devices, such as smart watches, that enable quiz participants to raise their hands such that the order in which participants raise their hand determines the order in which quiz participants are allowed to offer their answers to the current quiz question. Other suitable wearable devices could also be used in a similar way.

At 320, the response is checked for correctness, and, at 322, the respondent's score is updated.

At 324, a determination is made with respect to whether the quiz is finished. If the quiz is not finished, the no branch from 324 is followed to 312, where the next quiz question is asked. If the quiz is finished, the yes branch from 324 is followed to 326, where the one or more quiz participants are asked whether to start another quiz. If the response is yes, then the yes branch is followed to 304. If the response is no, then the no branch is followed to 306, where the quiz is deactivated.

Although the check for a low-risk-driving situation is shown only at 304 in FIG. 3, in various embodiments, when a low-risk-driving situation no longer exists during a quiz, the quiz may be deactivated, such as, for example, in response to a processor interrupt or the like, upon detecting that the low-risk-driving situation no longer exists.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. An apparatus comprising:
an automotive head unit configured to be installed in a vehicle and configured to:
wirelessly retrieve quiz questions and quiz answers from a quiz server;
receive data from vehicle sensors regarding whether the vehicle is in a low-risk-driving situation;
when the data received from the vehicle sensors indicates that the vehicle is in a low-risk-driving situation:
verbally administer a quiz by reciting one or more quiz questions via an audio speaker associated with the automotive head unit receive, via a microphone associated with the automotive head unit, one or more quiz answers spoken by one or more vehicle occupants; and check the quiz answers for accuracy, and wherein the quiz is automatically initiated based on driving conditions.

2. The apparatus of claim 1, wherein the automotive head unit is further configured to: wirelessly provide quiz scores to the quiz server for posting by the quiz server.

3. The apparatus of claim 1, wherein the vehicle sensors are selected from the group consisting of: one or more cameras, radar, lidar, pedestrian detection, night vision, blind spot detection, drowsiness detection, adaptive cruise control, and lane departure warning.

4. The apparatus of claim 1, wherein the low-risk-driving situation includes driving on a highway while using cruise control in low traffic volume, and the low-risk-driving condition excludes congested traffic on urban or suburban streets.

5. The apparatus of claim 1, wherein the head unit is further configured to establish a plurality of wireless data links to a plurality of data-enabled wearable devices worn by vehicle occupants thereby allowing multiple quiz participants to raise their hands to indicate to the head unit that the vehicle occupants are ready to answer a question.

6. The apparatus of claim 1, wherein the head unit is further configured to identify a person answering a quiz question via speech recognition.

7. A method comprising:
initiating a quiz in a vehicle;
determining whether the vehicle is in a low-risk-driving situation; if the vehicle is in a low-risk-driving situation:

asking a user to specify subject matter for the quiz; wirelessly retrieving quiz questions and quiz answers from a quiz server; administering quiz questions to one or more vehicle occupants via one or more audio-system speakers in the vehicle; receiving spoken quiz answers via a microphone in the vehicle; checking the quiz answers for correctness; maintaining one or more quiz scores based on at least one of: number of correct answers, question difficulty, and response times; and wirelessly sending the one or more quiz scores to the quiz server, and wherein the quiz is automatically initiated based on driving conditions.

8. The method of claim 7, wherein the quiz is initiated in response to a verbal request from a vehicle occupant.

9. The method of claim 8, wherein the quiz is initiated for either a single quiz taker or multiple quiz takers based on a number of quiz participants specified in the verbal request.

10. The method of claim 7, wherein the driving conditions are selected from a user-selectable group consisting of: driver drowsiness, highway driving, low-traffic volume, and cruise control activated.

11. The method of claim 7, wherein determining whether a low-risk-driving situation exists further comprises using vehicle sensors selected from the group consisting of: one or more cameras, radar, lidar, pedestrian detection, night vision, blind spot detection, drowsiness detection, adaptive cruise control, and lane departure warning.

12. The method of claim 7, further comprising: if there are multiple quiz participants, determining an identity of the person answering the quiz question.

13. The method of claim 12, wherein determining the identity of the person answering the quiz question is performed by speech recognition.

14. The method of claim 12, wherein identification of the person answering the quiz question is performed by quiz participants wearing smart watches and raising their hands such that the order in which participants raise their hands determines an order in which quiz participants are allowed to offer answers to the quiz question.

15. The method of claim 7, further comprising: deactivating the quiz upon detecting that the low-risk-driving situation no longer exists.

* * * * *